Sept. 1, 1936. W. REINERS ET AL 2,052,895
CREELING WINDING FRAME
Filed Aug. 3, 1934 2 Sheets-Sheet 2
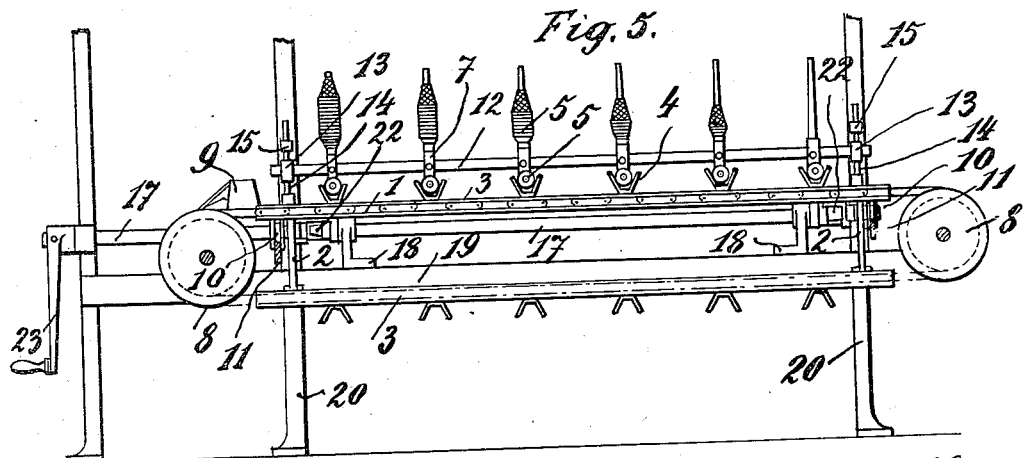
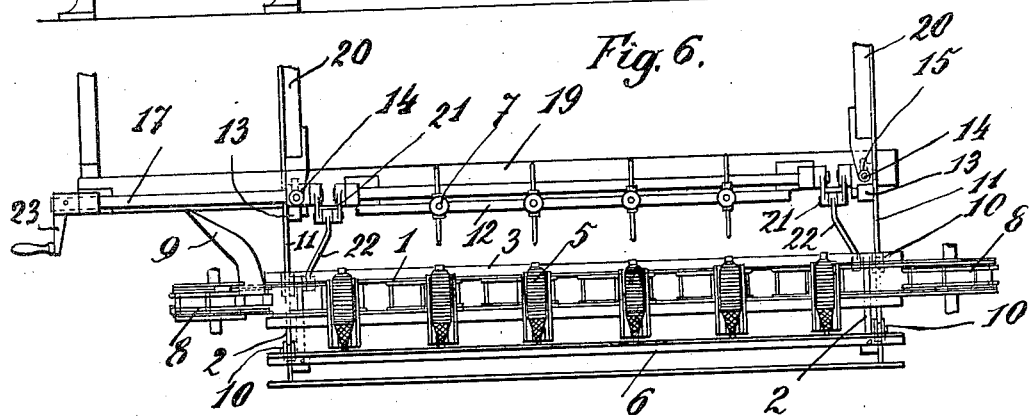
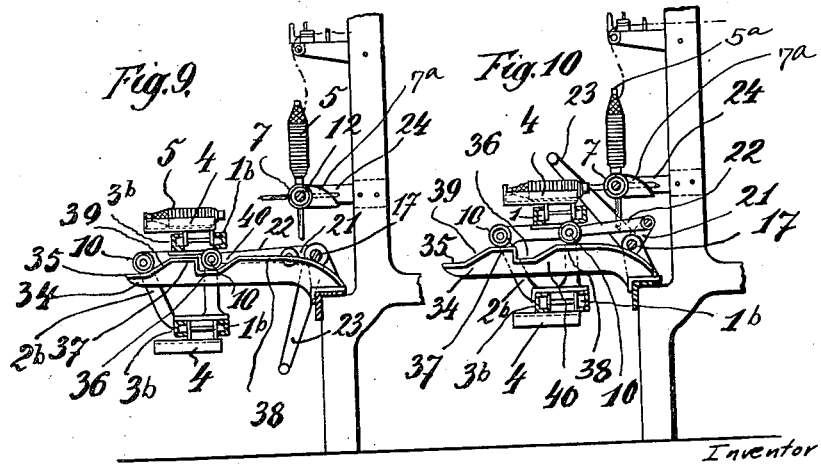
Inventors:
WILHELM REINERS
and GUSTAV KAHLISCH
by: Knight Bro.
Attorneys.

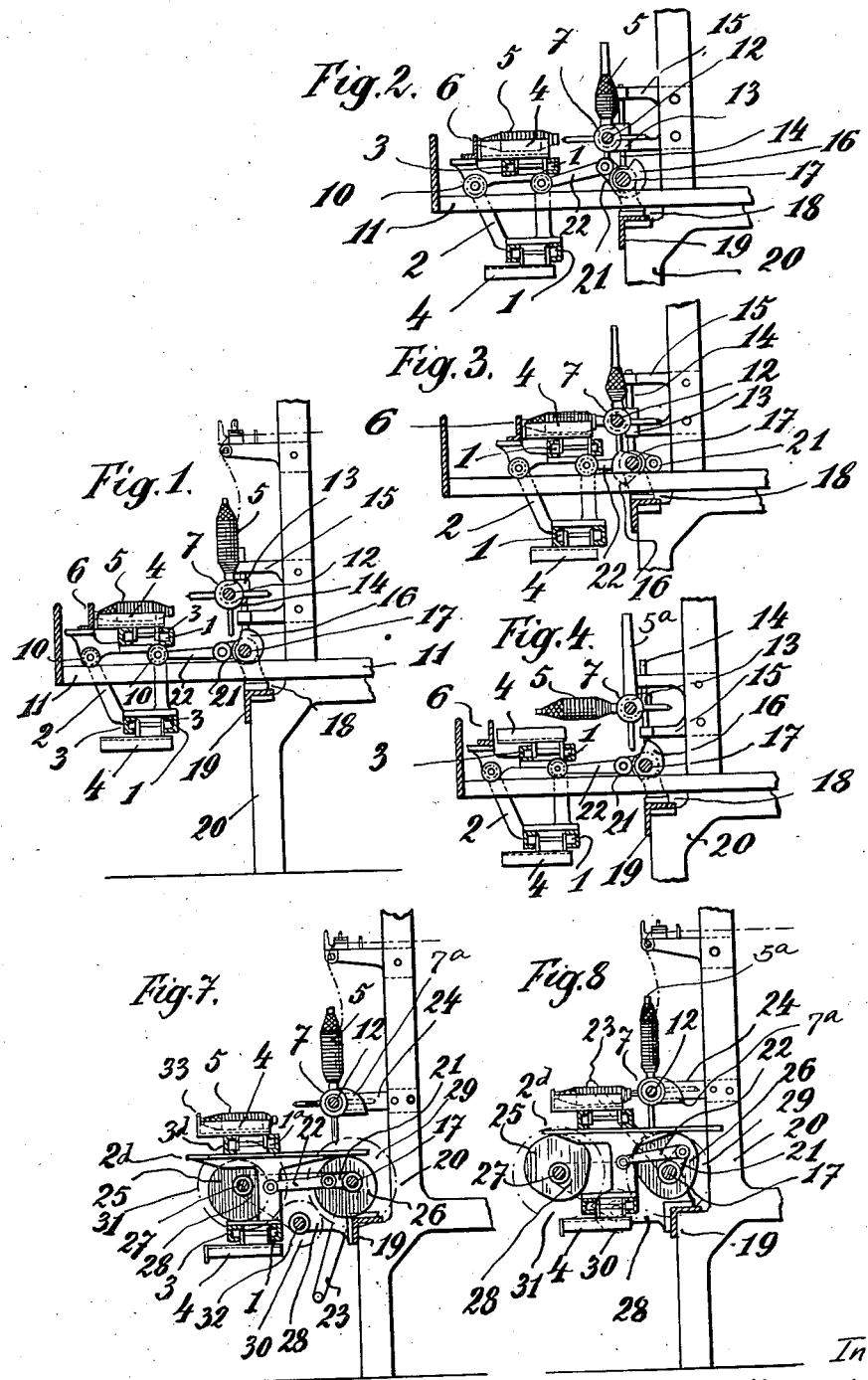

Patented Sept. 1, 1936

2,052,895

UNITED STATES PATENT OFFICE 2,052,895

CREELING WINDING FRAME

Wilhelm Reiners and Gustav Kahlisch, Gladbach-Rheydt, Germany, assignors to W. Schlafhorst & Co., Gladbach-Rheydt, Germany, a corporation of Germany Application August 3, 1934, Serial No. 738,362
In Germany August 18, 1933

7 Claims. (Cl. 242—35.5)

Our specification in application Serial No. 516,448, filed February 17, 1931, describes and claims mechanism comprising an endless conveyor whereby bobbins are conveyed to positions facing the spindles or skewers of a winding frame, and means whereby, when the bobbins face the spindles, a relative movement between the conveyor and spindles is caused to take place, causing the bobbins placed on the spindles, or donned, the doffing of the empty tubes being performed automatically. The object of our present invention is to simplify the mechanism and render the same more compact, at the same time enabling the operation to be performed with a minimum of risk of damaging delicate bobbins.

According to the invention an additional movement is imparted, namely, a movement whereby before and after the donning operation the spindles and the conveyor are placed at different levels, so that the longitudinal movement of the conveyor takes place at a level different from that which the conveyor occupies during the donning operation. The additional movement referred to may be made by the spindles, or by the conveyor itself.

The advantages derived from this arrangement will be explained hereinafter.

Three examples of apparatus according to the invention are shown in the annexed drawings, in Figs. 1 to 6, Figs. 7 and 8 and Figs. 9 and 10 respectively.

Fig. 1 is a sectional view of the machine along one of the winding stations,

Fig. 2 is a view corresponding to Fig. 1 showing the machine parts in a different position in preparedness for the donning operation.

Fig. 3 is a view corresponding to Fig. 2, with the parts at the conclusion of the donning operation, Fig. 4 is a view corresponding to Figs. 1–3 showing the parts in their rest positions, Fig. 5 is front elevation of Fig. 1, Fig. 6 is a plan view of Fig. 5, Figs. 7 and 8 are sectional views of a second embodiment of the machine, taken along one of the winding stations, showing the parts in different operative positions, and Figs. 9 and 10 are sectional views of a third embodiment of the machine, taken along one of the winding stations, showing the parts in different operative positions.

Referring first to the construction shown in Figs. 1 to 6, an endless conveyor chain 1 works in a movable frame consisting of two brackets 2 connected to each other by channeled bars 3 guiding the chain. Attached to the chain are cradles 4 for the bobbins 5, and the brackets carry an adjustable bar 6 serving as an abutment for the bobbins, for the purpose of pushing them on to the spindles, which radiate from rotatable sleeves or hubs 7. The chain is driven by means of sprocket wheels 8. An arm 9 (Figs. 5 and 6) projects laterally from the chain 1 so that it strikes the downwardly directed spindles in passing, and rotates the spindle holders. There may be more than one such arm on the chain.

The brackets 2 are mounted by means of rollers 10 on rails 11, enabling the frame to be moved transversely of the bank of spindles. The spindle holders 7 are mounted on a shaft 12 supported by bearings 13 fixed to vertical rods 14, which are slidable in bearings 15 fixed to the machine frame 20. The rods 14 rest on cams 16 fixed to a shaft 17 rotatable in bearings 18 carried by a frame member 19. The shaft 17 has cranks 21 connected by rods 22 to the frame 2, 3, and it can have a crank handle 23 for rotating it by hand.

It will be seen that by rotation of the shaft 17 the shaft 12 with the spindle holders can be raised and lowered. Figs. 1, 4 and 5 show the shaft 12 in its highest position and from Fig. 4 it will be seen that in this position the cradles 4 on the conveyor 1 can pass freely under bobbins 5 carried by spindles in a horizontal position over the conveyor. Fig. 1 shows the horizontal spindle without a bobbin thereon, but there is a bobbin 5 in the cradle 4 in front of the spindle. Rotation of the shaft 17 then causes the cams 16 to drop the spindle holder, so that the horizontal spindle is placed in line with the bobbin tube, as shown in Fig. 2, and the connecting rod 22 pulls the frame 2, 3 towards the spindle holder, so that the bar 6 pushes the bobbin on to the spindle, as shown in Fig. 3, whereupon the cams lift the spindle holder again and the connecting rod 22 pushes the frame 1, 2 back to its original position, as shown in Fig. 4.

The bobbin is held and guided by the cradle 4 during the whole operation of pushing it on to the spindle, and this is one of the advantages secured, as compared with the arrangements shown in the above-mentioned earlier specification.

A single revolution of the cams lowers the bank of spindles into line with the bobbin tubes, pulls the conveyor towards the spindles so that the bobbins are donned, and pushes the conveyor back and lifts the spindles so that the bobbins thereon clear the cradles on the conveyor.

In the modification shown in Figs. 7 and 8 the shaft 12 carrying the spindle holders is mounted in stationary bearings 24 fixed to the frame 20, but the frame 2a, 3a carrying the conveyor 1a is vertically movable as well as horizontally movable. It rests on two cams 25, 26 fixed to shafts 27 and 17 respectively. These shafts have bearings in brackets 28 and are connected to each other by gear wheels 29, 30, 31, the wheel 29 being fixed to the shaft 17, the wheel 30 to a shaft 32, and the wheel 31 to the shaft 27. The shaft 17 can be rotated by means of a hand crank 23, for which some suitable automatic drive may be substituted. Rotation of the shaft 17 causes the frame 2a, 3a to be raised and lowered, with the endless conveyor 1a. It is shown in its highest position in Fig. 8 with the bobbins in line with the horizontal spindles directed towards them. Fig. 7 shows the frame 2a, 3a in its lowest position. The shaft 17 has cranks 21 with rods 22 connecting them to the frame 2a, 3a, so that in addition to being raised and lowered the frame, with the conveyor 1a and cradles 4, is moved transversely, the arrangement being such that when the bobbin tubes are in line with the spindles the frame is pulled towards the spindles, whereby the bobbins are donned, whereupon the frame is pushed back and lowered. For pushing the bobbins on to the spindles each cradle has an abutment 33 for the tip of the tube.

In the modification shown in Figs. 9 and 10 the shaft 12 carrying the spindle holders 7 likewise has fixed bearings, so that the frame 2, 3 must move up and down, in addition to moving to and from the spindles. The frame 2b, 3b in this case is mounted by means of rollers 10 on brackets 34, on which are tracks or runways for the rollers. Each of these runways is composed of four horizontal parts 35, 36, 37, 38, with inclined parts 39 and 40 connecting the parts 35 and 36 respectively with the parts 37 and 38. When the rollers 10 rest on the parts 35, 36 the frame 2b, 3b is at its lowest level, as shown in Fig. 9, and when it is pulled up the inclined parts of the track on to the parts 37, 38 it is at its highest level, as shown in Fig. 10. The movement is imparted by cranks 21 on a shaft 17, with rods 22 connecting the cranks to the frame.

It will be clear, that the arrangement whereby the conveyor with the bobbin carriers or cradles is, in one position, at a level below the spindles on which bobbins have been placed enables the width of the machine from front to rear to be substantially less than is the case where the withdrawal of the bobbin carriers from the bobbins is effected solely by a horizontal movement. This reduction of width facilitates the work of the operative and enables cop carriers or cradles of ample length to be used, so that the bobbins are held securely while being conveyed along the bank of spindles, and while being donned. The use of cranks and cams for traversing the conveyor and moving it up and down, or for traversing the conveyor and moving the spindles up and down, enables the actuation to be effected by rotation in one direction only, which is of considerable advantage.

The automatic doffing of the empty tubes may be effected by means of any of the devices shown for that purpose in the specification of our application Serial No. 516,448. Such doffing means are shown in Figs. 7–10 of the instant disclosure, consisting of a fixed cam 7a adjacent each spindle hub, which engages the end of the empty bobbin tube 5a in the course of the rotation of the shaft 12 with the hubs 7 mounted thereon, thereby stripping the tubes from the spindles.

What we claim as our invention and desire to secure by Letters Patent of the United States is:—

1. A textile winding machine having in combination a bank of skewers for receiving paying-off bobbins, an endless conveyor for conveying bobbins lengthwise of said bank of skewers to positions opposite said skewers, means for lowering said skewers from a position elevated above the level of said conveyor to a position in which said skewers face the bobbins on said conveyor, and for returning said skewers to said elevated position, and means for moving said conveyor transversely towards said skewers, when said skewers are lowered, whereby bobbins are transferred to said skewers, and for retracting said conveyor after the transfer of said bobbins.

2. A textile winding machine having in combination a bank of skewers for receiving paying-off bobbins, an endless conveyor for conveying bobbins lengthwise of said bank of skewers to positions opposite said skewers, a horizontally movable frame carrying said conveyor, a crank shaft and connecting rods moving said frame and conveyor to and from said bank of skewers, and cams raising and lowering said skewers, said cams lowering said skewers from a position above the level of said conveyor to a position in which said skewers are in line with the bobbins on said conveyor when said crank shaft moves said conveyor towards said skewers, whereby said bobbins are transferred to said skewers.

3. A textile winding machine having in combination a bank of skewers for receiving paying-off bobbins, an endless conveyor for conveying bobbins lengthwise of said bank of skewers to positions opposite said skewers, a frame carrying said conveyor, cams supporting said frame and raising and lowering the same, and a crank-shaft and connecting rods connected to said frame and moving the same to and from said bank of skewers, said crank shaft and cams co-operating to lift said frame and conveyor from a level below the level of said skewers to a position in which the bobbins on said conveyor face said skewers, and to transfer the lifted bobbins to said skewers and then return said frame with said conveyor to its lowered position.

4. A textile winding machine having in combination a bank of skewers for receiving paying off bobbins, an endless conveyor for conveying bobbins along said bank of skewers to positions opposite said bobbins, a movable frame carrying said conveyor, a runway which is in part inclined and in part horizontal and supports said frame, and mechanism for moving said frame to and fro on said runway transversely of the direction of said conveyor, whereby said conveyor is raised from a position below the level of said skewers to a position in which the bobbins on said conveyor face said skewers, and is then first moved towards said skewers, for donning said bobbins, and then retracted from said skewers and lowered again.

5. In a winding machine a group of horizontal skewers, a group of bobbin handling members coordinated with but normally out of horizontal alinement with said skewers, means to move said group of bobbin handling members horizontally with respect to said group of skewers for skewering the bobbins, and means operating in unison with said last-mentioned means for moving one of said groups vertically to aline the bobbins and skewers prior to their engagement and vertically in the opposite direction after the skewering movement is completed to restore said groups to their normal levels.

6. A winding machine as described in claim 5, wherein all of said relative movements of said groups are derived from a common driving member.

7. A winding machine as described in claim 5, wherein said bobbin handling members are mounted on an endless conveyor.

W. REINERS.
GUSTAV KAHLISCH.